(12) United States Patent
D'Souza et al.

(10) Patent No.: US 8,122,287 B2
(45) Date of Patent: Feb. 21, 2012

(54) MANAGING A DATA STORAGE SYSTEM

(75) Inventors: Jerald Herry D'Souza, Bangalore (IN);
Vijay Francis Gregary Lobo,
Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/880,351

(22) Filed: Sep. 13, 2010

(65) Prior Publication Data

US 2010/0332893 A1 Dec. 30, 2010

Related U.S. Application Data

(62) Division of application No. 11/856,786, filed on Sep. 18, 2007, now Pat. No. 7,827,434.

(51) Int. Cl.
*G06F 11/00* (2006.01)

(52) U.S. Cl. ........ 714/6.3; 714/4.12; 714/6.11; 714/6.2; 714/6.21; 714/6.32; 714/57

(58) Field of Classification Search ................ 714/4.12, 714/6.11, 6.32, 57, 6.2, 6.21, 6.3
See application file for complete search history.

(56) References Cited

U.S. PATENT DOCUMENTS

| 5,430,855 | A | 7/1995 | Walsh et al. |
| 5,479,653 | A | 12/1995 | Jones |
| 5,644,767 | A | 7/1997 | Rathunde |
| 6,442,711 | B1 | 8/2002 | Sasamoto |
| 6,836,832 | B1 | 12/2004 | Klinkner |
| 6,915,448 | B2 | 7/2005 | Murphy et al. |
| 6,934,804 | B2 | 8/2005 | Hashemi |
| 7,260,699 | B2 | 8/2007 | Nakagawa et al. |
| 7,266,717 | B2 | 9/2007 | Cassell et al. |
| 7,356,732 | B2 | 4/2008 | Rowe et al. |
| 7,398,432 | B2 * | 7/2008 | Arbeitman et al. ............. 714/57 |
| 7,424,637 | B1 | 9/2008 | Schoenthal et al. |
| 7,441,143 | B2 * | 10/2008 | Arai et al. .................... 714/5.11 |
| 2003/0056142 | A1 | 3/2003 | Hashemi |
| 2004/0236986 | A1 | 11/2004 | Ng |
| 2005/0177764 | A1 | 8/2005 | Cassell et al. |
| 2005/0193273 | A1 | 9/2005 | Burkey |
| 2005/0251619 | A1 | 11/2005 | Hajji et al. |
| 2007/0067666 | A1 * | 3/2007 | Ishikawa et al. .................. 714/6 |
| 2009/0063768 | A1 | 3/2009 | Kalos et al. |

FOREIGN PATENT DOCUMENTS

JP 10189358 7/1998

OTHER PUBLICATIONS

Burkes, T.A., et al. "Adaptive Hierarchical RAID: A Solution to the RAID 5 Write Problem", CMG, Part 2 of 2, Dec. 3-8, 1995.

* cited by examiner

*Primary Examiner* — Charles Ehne
(74) *Attorney, Agent, or Firm* — Owen J. Gamon

(57) ABSTRACT

A RAID storage system is provided with a plurality of disk drive modules in communication with a processor through a RAID controller. Tools and processes are provided for managing failure of individual modules in the RAID, identifying and managing excess spare modules, and migrating modules among array sites to produce uniform or near-uniform array sites.

16 Claims, 13 Drawing Sheets

MANAGING A DATA STORAGE SYSTEM

CROSS-REFERENCE TO RELATED APPLICATIONS

This application is a divisional of co-pending U.S. patent application Ser. No. 11/856,786 filed Sep. 18, 2007, which is herein incorporated by reference in its entirety.

BACKGROUND OF THE INVENTION

1. Technical Field

This invention relates to storage systems. More specifically, this invention relates to management of disk drive modules in the redundant array of independent disk system.

2. Description of the Prior Art

Redundant Arrays of Independent Disks (RAID) is a taxonomy of redundant disk array storage schemes defining a number of ways of configuring and using multiple computer disk drive modules (hereinafter "drives") to achieve varying levels of availability, performance, capacity, and cost, while appearing to the software application as a single large capacity drive. Conventional RAID storage systems can be implemented in either by means of hardware or software. In the former instance, RAID algorithms are packaged into separate controller hardware coupled to the computer input/output (I/O) bus. The software implementation incorporates RAID algorithms into system software executed by a processor together with the operating system, and obviates the need and cost of a separate hardware controller.

RAID systems employ controllers to link a host computer with one or more storage devices in the RAID. These controllers handle management of the disks in the RAID. FIG. 1 is an exemplary computer system in which a RAID, or other disk array, is implemented. An apparatus (10) may represent practically any type of computer, computer system, or other programmable electronic device, including a client computer, a server computer, a portable computer, a handheld computer, an embedded controller, a personal digital assistant, etc. In one embodiment, an apparatus (10) may be implemented using one or more networked computers, e.g. in a cluster or other distributed computing system. The apparatus (10) will hereinafter also be referred to as a "computer" although it should be appreciated that the term "computer" may also include other suitable programmable electronic devices consistent with the invention.

A computer (10) typically includes at least one processor (12) coupled to memory (14). A processor (12) may represent one or more processors, and memory (14) may represent random access memory devices comprising the main storage of the computer (10), as well as any supplemental levels of memory, e.g. cache memory, non-volatile memory, backup memory, read-only memory, etc. In addition, memory (14) may be considered to include memory storage physically located elsewhere in the computer (10), e.g. any cache memory in a processor (12), as well as any storage capacity used as a virtual memory, e.g., as stored on the disk array (34) or on another computer coupled to the computer (10) via a network (18).

The computer (10) typically receives a number of inputs and outputs for communicating information externally. For interface with a user or operator, the computer (10) typically includes one or more user input devices (22), e.g. a keyboard, a mouse, a trackball, a joystick, a touchpad, a microphone, etc., and a display (24), e.g. a monitor, a display panel, a speaker, etc. Otherwise, user input may be received via another computer interfaced with the computer (10) over the network (18) via a dedicated workstation interface or the like. For additional storage, the computer (10) may also include one or more mass storage devices accessed via a storage controller, or adapter, (16). The mass storage devices may take the form of a removable disk drive, a hard disk drive, a direct access storage device, an optical drive, a tape drive, etc. In addition, the computer (10) may include an interface with one or more networks (18), e.g. a LAN, a WAN, a wireless network, etc., to permit the communication of information with other computers coupled to the network. It should be appreciated that the computer (10) typically includes suitable analog and/or digital interfaces between a processor (12) and each of the components (14), (16), (18), (22), and (24) as is well known in the art.

A computer (10) operates under the control of an operating system (30), and executes software programs (32) or otherwise relies upon various computer software applications, components, programs, objects, modules, data structure, etc. Moreover, various applications, components, programs, objects, modules, etc. may also execute on one or more processors in another computer coupled to the computer (10) via a network (18), e.g., in a distributed or client-server computing environment, whereby the processing required to implement the functions of a computer program may be allocated to multiple computers over a network.

FIG. 2 is a block diagram (100) of a prior art disk array system illustrating configuration of array sites in a RAID. In this illustration, two storage enclosures are shown (102) and (104), although in one embodiment, there may be more storage enclosures. Each storage enclosure (102) and (104) houses a plurality of disk drive modules, from a larger storage enclosure (108), with each disk drive module therein generally of the same storage capacity and RPM. In one embodiment, an enclosure may house sixteen disk drive modules. The disk drive modules in each enclosure (102) and (104) are in communication with the storage controller (116), hereinafter referred to as a device adapter, through an electrical connection known as a dual loop. As shown, storage enclosure (102) is connected to the device adapter (116) through a first dual loop (112), and storage enclosure (104) is connected to the device adapter (116) through a second dual loop (114). All disk drive modules in the storage enclosure (102) belong to the first dual loop (112), and all disk drive modules in the storage enclosure (104) belong to the second dual loop (114). An array site (120) is a grouping of eight disk drive modules, with four disk drive modules selected from the first dual loop (112) and four disk drive modules selected from the second dual loop (114), i.e. the array site will have four disk drive modules each from storage enclosure (102) and storage enclosure (104). A RAID is created with a minimum of one array site (120), wherein each array sites forms an array (122). Array (122) is a logical form of array site which is used for managing and maintaining the RAID efficiently. At the time of creation of the RAID (124), some of the disk drive modules in each array site may be designated as spare modules. Furthermore, each array site will be assigned to a RAID. Array sites are assigned to a RAID during creation of the RAID. If the array site is not assigned to a RAID, the array site is classified as unassigned and may be maintained for creation of future RAIDs.

It has become accepted in the art to have a minimum number of spare disk drive modules on each array site designated as spare modules, with spare modules originating from the first dual loop and the second dual loop in communication with the device adapter, as disk drive modules tend to fail for various reasons. When a drive fails, it needs to be either repaired or replaced, and the RAID needs to continue operating without loss of data or any apparent affect on the operation of the RAID. Prior art processes are provided to check for availability of spare disk drive modules on a single unassigned array site. If more than one spare disk drive module exists on each dual loop on the unassigned array site, the spare modules are removed from the array site. However, there are drawbacks with the prior art process for freeing up spare modules in an array site. Such drawbacks include complexity and inefficiency of the algorithm, as well as the inability to fulfill the standard of maintaining a minimum number of spare modules for a pair of dual loop connections of an assigned array site to a single device adapter.

Accordingly, there is a need to efficiently control the quantity and availability of spare disk drive modules at an array site. A process should address the limitations of the prior art and enable the RAID to continue operating with confidence that one appropriately configured modules be available.

FIG. 3 is a flow chart (200) illustrating a prior art process for determining if any drives in a RAID have failed and attending to repair and/or replacement of the failed drive. When a RAID member drive fails, the controller automatically swaps the failed drive with a spare drive and initiates data recovery. A routine is invoked at preset time intervals to evaluate the status of the RAID. In one embodiment, the routine may be in the form of a script or shell script, and the routine is programmed to execute once every hour. There are three primary elements to the routine, determining if any disk drives have been rejected or failed by the RAID adapter, determining if any disk drives have been bypassed, and determining if a failed disk drive is in need of immediate repair. In the context used herein, a bypassed drive is a drive that is electrically isolated from rest of the system. For example, a drive gets bypassed if the performance is degraded or if the drive is pulled out of the system. Once the routine is started (202), the initial test is to determine if any disk drives in the RAID have been rejected or failed (204). A negative response to the test at step (204) will result in a subsequent test to determine if any disk drives in the RAID have been bypassed (208). A positive response to either of the tests at steps (204) and (208) results in a subsequent test to determine if the failed or bypassed drive is in need of immediate repair (206). If the response to the test at step (206) is positive, the error(s) for the disk drive(s) identified at step (206) are entered into an error log and a disk drive management routine is called to update the object model (210), i.e. to designate the failed drive as failed spare and the spare drive as RAID member. Thereafter, a service event is received by a hardware management console (212), and the drive is unconfigured (214). In one embodiment, a service event may be an error log. In the context used herein, unconfigure is defined as removing the drive entry from Object Data Manager (ODM), checking the effect of repairing that drive on the system, and isolating the drive for repair. Thereafter, the failed module is replaced with a new module, and the new module is configured (216) and formatted (218) to make it available within the array. Following step (218) or a negative response to the tests at step (206) or (208), the routine returns to step (220) to wait for a set period of time before returning to step (202). In one embodiment, the set period of time is sixty minutes. Accordingly, the above-outlined routine identifies failed drives and attends to repair and/or replacement thereof.

However, there are drawbacks with the prior art repair and/or replacement routine. One such drawback is the scheduling of the routine. The prior art routine is not automated and only operates at preset times. If one of the disk drives fails in between a sequential set of routines, the failure of the disk drive will not be detected and reported until the running of the next routine. In addition, the repair process of a failed disk drive is not prompt. A person must physically review the error log generated by the routine and attempt to repair the failed drive causing a delay in the repair process. In addition, the prior art does not address failure of multiple disk drives during the execution of this routine and identification of such during a single routine execution. This could give rise to a situation where spare disk drive gets exhausted and multiple RAIDS may be degraded. If there is an insufficient quantity of spare disk drives available at any time, then the RAID system can become inefficient or cause loss of data. Finally, the process of running a device health check on an hourly basis, or a different preset time interval utilizes processor and memory resources. This affects the physical performance of the associated computer and the array of disk drives.

Accordingly, there is a need to automate the process of identifying and repairing faulty disk drives in a RAID. An automated process should address the limitations of the prior art and enable the RAID to continue operating in an uninterrupted manner during a repair and/or replacement process.

It is also known in the art that spare disk drive modules are used to replace a failed or failing disk drive module. As such, it is critical that a spare module be available in a RAID with the capacity and RPM matching or greater than the failed module. One know prior art algorithm for creating spare disk drive modules assigns numerical identifiers to each array site and then divides the array sites based upon whether the numerical identifier is an odd number or an even number. Spare disk drive modules are created on array sites with an odd identifier from the first dual loop, and spare disk drive modules are created on array sites with an even identifier from the second dual loop.

However, there are drawbacks associated with this prior art algorithm. For example, array sites are created in a simultaneous manner and are continuously manipulated. There is likelihood that the assignment of an even distribution of odd and even numbered array sites to a device adapter may not be equitable. This would result in creation of spare disk drive modules on such array sites in a manner that reflects the arbitrary nature of assignment of odd and even numerical identifiers to the array site and creation of spare disk drive modules based on this arbitrary assignment.

Accordingly, there is a need to create an algorithm that assigns spare disk drive modules to unassigned array sites based upon the operating characteristics of both the module and the array site. The algorithm should address the limitations of the prior art and enable the assignment to ensure that a failed disk drive module can be temporarily or permanently replaced by a spare module with a capacity and speed that can match or exceed that of the failed or failing disk drive module.

In response to failure and replacement of disk drive modules, an array site and a RAID may become imbalanced due to unavailability of a perfect matching spare drive for replacement. There are drawbacks with the lack of uniformity among the disk drive modules in the RAID. Such drawbacks may include reducing the performance of the RAID either by capacity, interface rate, and/or RPM, as well as waste of resources.

Accordingly, there is a need to efficiently control the assignment of disk drive modules to an array site during operation thereof. The process should address the desire to establish a uniform array site while allowing the RAID to continue operating with confidence of the availability of appropriately configured modules.

SUMMARY OF THE INVENTION

This invention comprises a method and system for managing disk drive modules in a multiple module disk array.

Accordingly, the invention provides a method and system for automatic failure detection and repair of a failed disk drive module. An array of disk drive modules are configured in communication with a controller through a bus. The controller, which is in communication with a processor and an associated operating system, has a buffer for storage of data. Drive information of a failed disk drive module is stored in the buffer that is in communication with the controller. In one embodiment, the drive information may be in the form of a disk serial number, operating RPM of the disk, disk capacity, interface rate, dual loop assignment, etc. An interrupt is generated in response to failure of a disk drive module. The interrupt is sent to an operating system in communication with the failed module. In response to the interrupt, the failed module is unconfigured from an associated slot. The failed module is replaced with either a repaired module or a new module.

In a further aspect of the invention, a method and system is provided for repair of a failed disk drive module. An array of disk drive modules are configured in communication with a controller through a bus. The controller has a buffer for storage of data, and is also in communication with a processor and an associated operating system. Each disk drive module is configured with a visual display to identify operating characteristics of the disk drive module. A failed disk drive module is identified via an indicator in communication with the display, and a repair process is initiated in response to the failure. The repair process generates an interrupt to the associated operating system of the processor and configures a substitute disk drive module to replace the identified failed disk drive module.

In a yet further aspect of the invention, a method and system is provided for managing storage media. A storage server is configured with an array of disk drive modules that supports replication of data among the modules. The array has a plurality of array sites, with each array site having disk drive modules on opposite dual loops of a device adapter in communication with the array. A minimum quantity of modules in the array site in communication with the device adapter is designated as spare modules with the intention of replacing a failed module. The designated spare modules are listed in descending order based upon inherent characteristics of each of the modules. Thereafter, it is determined if there are any designated spare modules in excess of the minimum quantity of modules in the dual loops of the device adapter. Based upon the determination, an excess spare module in the first dual loop is selectively designated as a spare module based upon a rank of the excess spare module in the listing.

In a further aspect of the invention, a method and system is provided for migrating a disk drive module. All RAIDs in the storage system are checked to see if there are any member disk drive modules with non-matching characteristics. If such a module exists, then the operating characteristics of a formatted disk drive module are compared with the corresponding RAIDs characteristics. The module with the non-matching characteristics is selected for replacement, and data from the selected module is copied to a replacement module. If formatted disk drive module is a near match to a RAID determined to have a non-uniform set of modules and a perfect matching replacement module is unavailable, then the near match module replaces the non-matching module. Similarly, if the formatted disk drive module is a match to a RAID determines to have a non-uniform set of modules, then the match module replaces the non-matching module. Once the copy is complete the formatted module becomes the new member replacing the mismatched member. Thereafter, the mismatched member module with non-matching characteristics is designated as a non-match module; it resumes operation as a spare module, a free module, or a replacement module.

In a further aspect of the invention, a method and system is provided for managing a RAID. Each unassigned disk drive module in communication with a device adapter located in the RAID is listed. Thereafter, the array site are sorted in descending order based upon the capacity of the array sites, following by a sorting of the array sites with an equal capacity based upon the respective RPM of those select sites. For each of the unassigned array sites, at least one disk drive module is set as a spare module on each dual loop.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a RAID storage system, an array of disk drives is provided for storage of data. It is known in the art that one or more of these modules may fail for various reasons and a failed module may be replaced with a spare module. Upon failure of one or more modules, spare or non-spare, in a RAID array site a routine is invoked to efficiently respond to such a failure so that repair and/or replacement of the failed module is automated. Controls are embedded to properly and effectively assign one or more spare disk drive module to an array site to temporarily or permanently replace the failed or failing disk drive module. In addition, a routine is invoked to ensure that each RAID is comprised of a plurality of disk drive modules that have uniform or near uniform operating characteristics. A non-uniform module is replaced with a uniform module, without loss of data, and the non-uniform module is designated as a spare module, or used as a replacement module for another RAID, or designated as a free module of an unassigned array site and made available to be assigned to an array site in the future.

A quantity of disk drive modules in each assigned array site is designated as spare modules. This configuration mitigates loss of data in the event of failure of a non-spare module at an array site by providing availability of the spare module. However, for an unassigned array site, there is no need to have an excess quantity of disk drive modules designated as spares. Such modules may be released from the array site or designated as a non-spare disk drive module on the array site to which it belongs.

Technical Details

Figure 1:
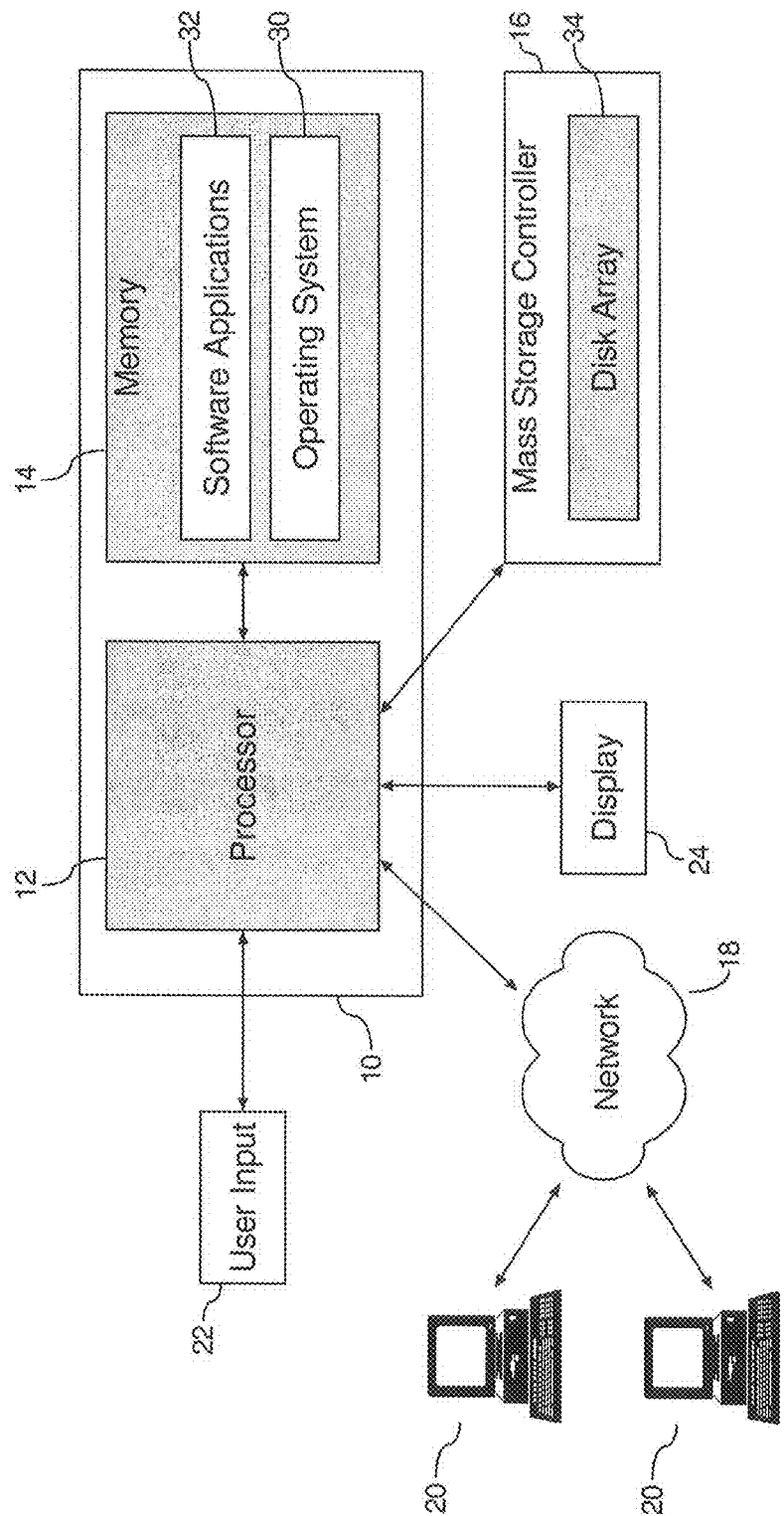
FIG. 1 is a prior art block diagram of a computer system employing a RAID.
Figure 2:
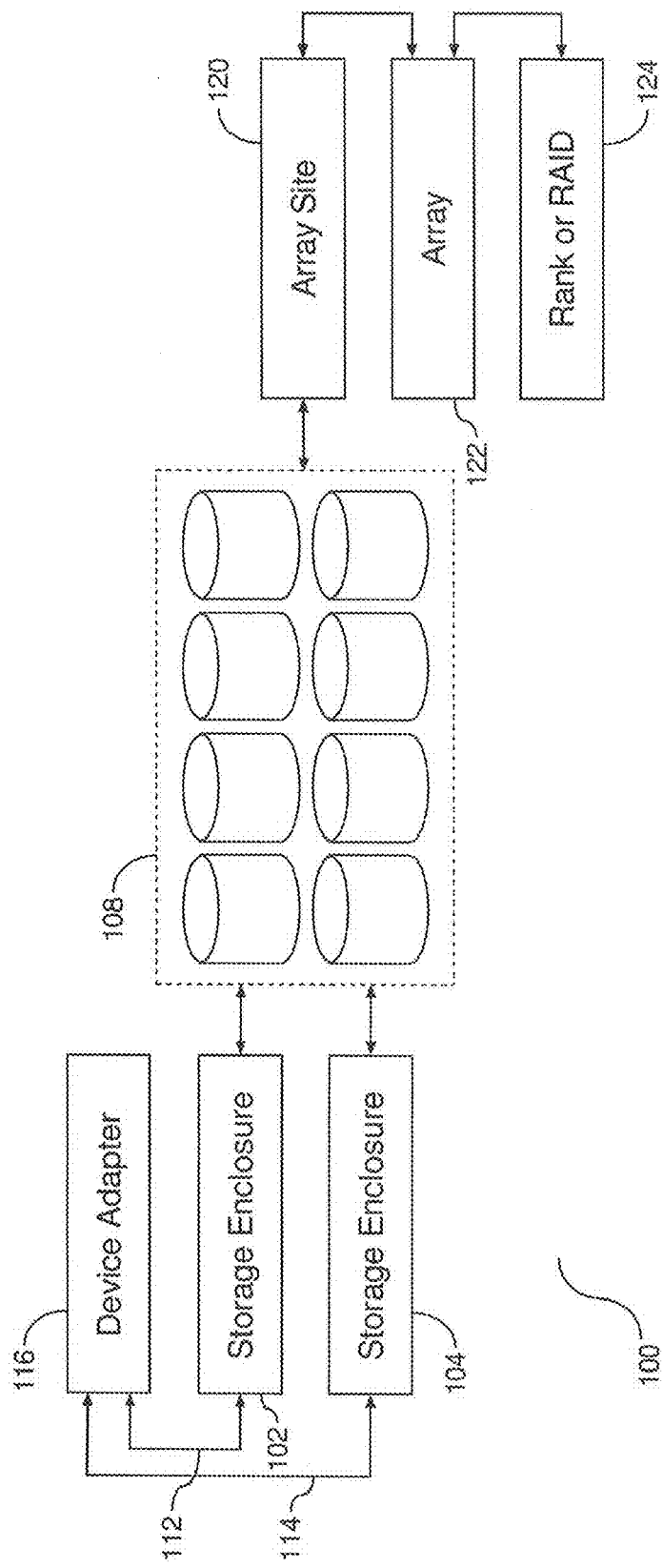
FIG. 2 is a prior art block diagram of a RAID.
Figure 4:
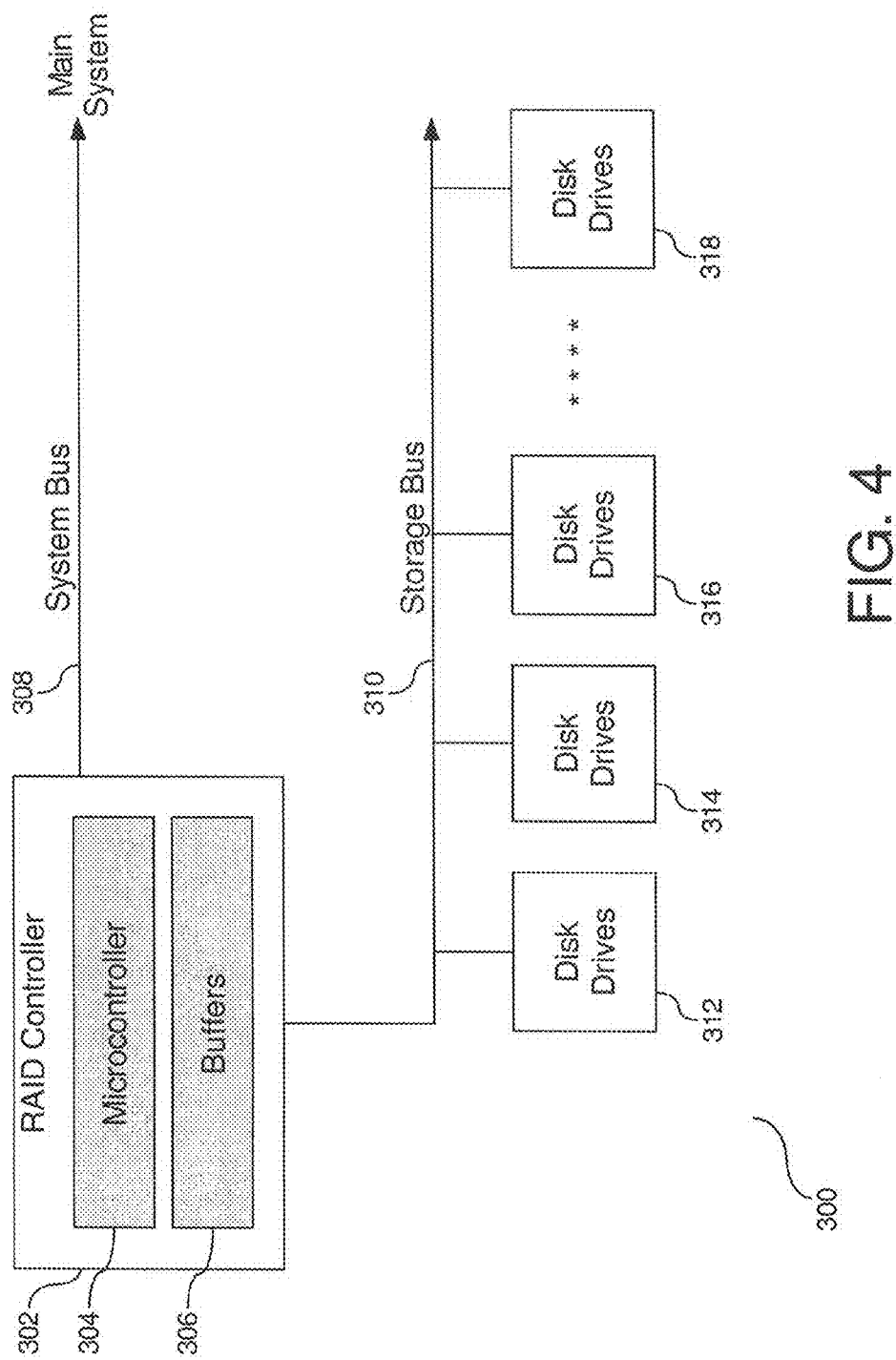
FIG. 4 is a block diagram of a RAID.

FIG. 4 is a block diagram (300) of a control subsystem of a disk array system. In particular, a RAID controller (16) of FIG. 1 is shown in more detail to include a RAID controller (302) coupled to a system bus (308) with a processor (12) and through a storage bus (310) to various disk drives (312), (314), (316), and (318) in the storage array. The RAID controller (302) includes a micro controller (304) to execute program code to implement a RAID algorithm for data protection, and that is typically resident in memory located in the RAID controller (302). The disk drives (312)-(318) can be individual disk drives that are directly coupled to the controller (302) through the storage bus (310), or may include their own disk drive adapters that permit a string of individual disk drives to be connected to a storage bus (310). In other words, a drive (312) may be physically implemented as four or eight separate disk drives coupled to a single controller connected to the storage bus (310). As data is exchanged between the disk drives (312)-(318) and the RAID controller (302) in either direction, buffers (306) are provided to assist in the data transfer(s).

Figure 5:
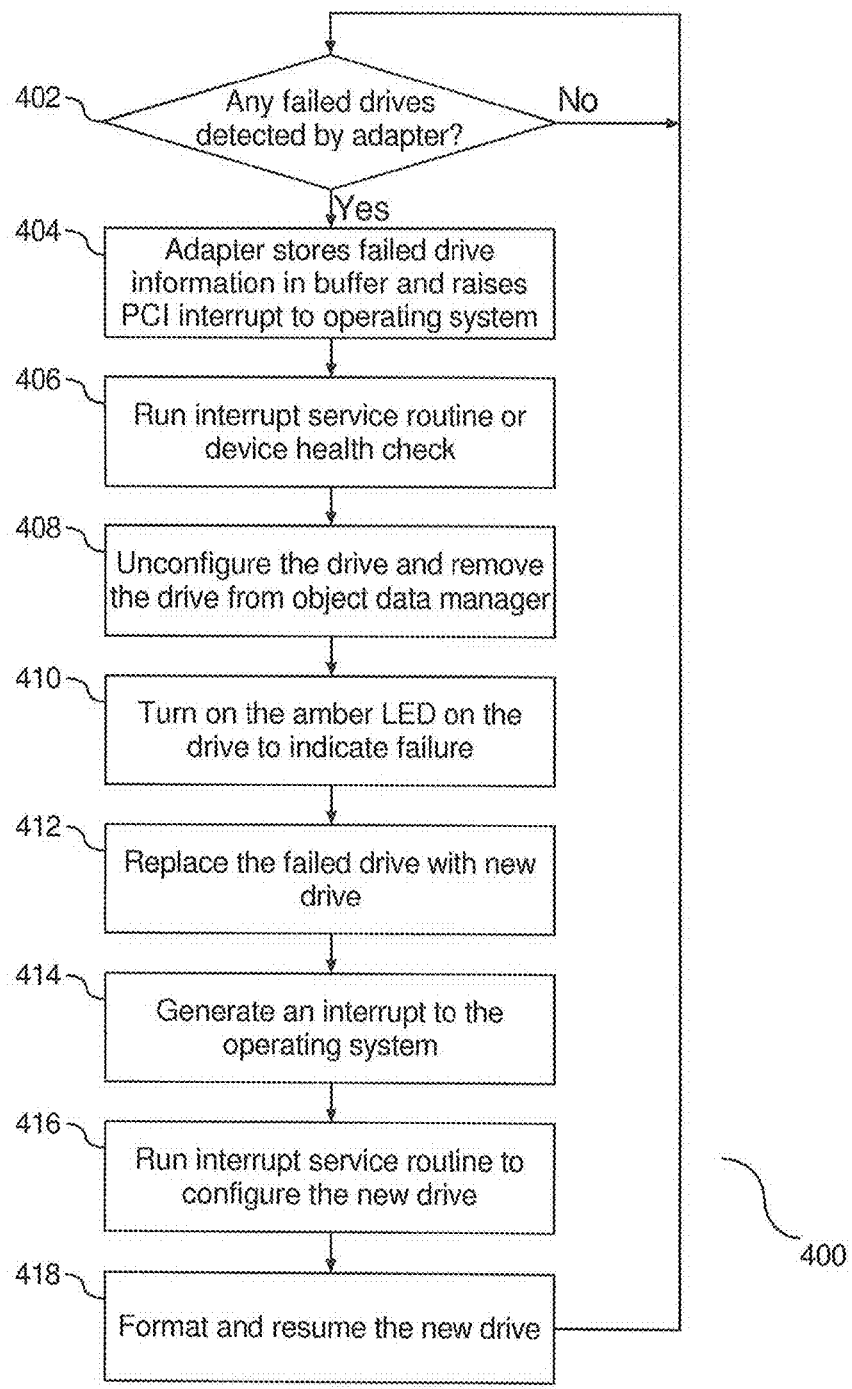
FIG. 5 is a flow chart illustrating an automated process for repairing or replacing failed modules in a RAID.

FIG. 5 is a flow chart (400) illustrating the process of detecting a failure of a disk drive of a disk array and for attending to the failure of the disk drive. Whenever a RAID member fails, the controller automatically detects the failed drive and initiates data recovery. Upon detection of a failure at step (402), the controller stores the information pertaining to the failed drive in the controller buffer and raises a peripheral component interconnect interrupt (PCI) to the host operating system (404). In one embodiment, failed drive information may include, but is not limited to, capacity, RPM, serial number, disk interface rate, etc. The drive information from the buffer for failed drive will be used during the interrupt service routine for replacing the drive. The failed drive data is automatically recovered by RAID logic and transferred to a spare drive in the system by the controller. In one embodiment, a spare drive is the drive known by the controller to make use in case of any failed drive to keep the RAID in a proper operating state. Responsive to the PCI interrupt, the operating system executes instructions to localize the failure to the controller for the failed module(s) (406). In one embodiment, the instructions are in the form of an interrupt service routine or a device health check. Following localization of the failure, the module is unconfigured and removed from the memory of the object data manager (ODM) (408). The ODM is a data manager intended for storing system information. Information is stored and maintained as objects with associated characteristics. The data stored in ODM includes, but is not limited to; drive configuration information, display information, vital product data system resource information, and communication configuration information. Once the drive associated with the failed disk drive is unconfigured, this slot is isolated and a visual indicator associated with the slot is illuminated (410). In one embodiment, the process of isolating the slot may include turning on a visual indicator associated with the slot. In one embodiment, the visual indicator may be in the form of a light emitting diode, or a similar visual element. The visual indicator enables a person to physically locate the slot that contains the failed disk drive. The process of locating a failed disk drive in an array of such modules is automated and does not require a periodic program to detect failure of a drive. Accordingly, upon failure of a disk drive the operating system receives a communication indicating the failure and the associated drive (s) is located and isolated so as not to affect the remaining operable disk drives in the array.

Following isolation and detection of the drive associated with the failed disk drive, the failed disk drive is replaced with an operable drive (412). In one embodiment, the replaced drive may be a new drive, or it may be the same drive that has been subject to a repair. Upon replacement of the failed drive, the RAID controller associated with the previously failed drive generates and sends an interrupt to the host operating system (414). Thereafter, an interrupt service routine is invoked by the operating system to configure the new drive that has replaced the failed drive (416). Following completion of the drive configuration at step (416), the new drive is formatted and resumes operation (418). The replacement drive may be used to recover any disk drives in the array that are not operating properly, or it may be reserved to function as a spare to replace any failed drives in the array.

Figure 3:
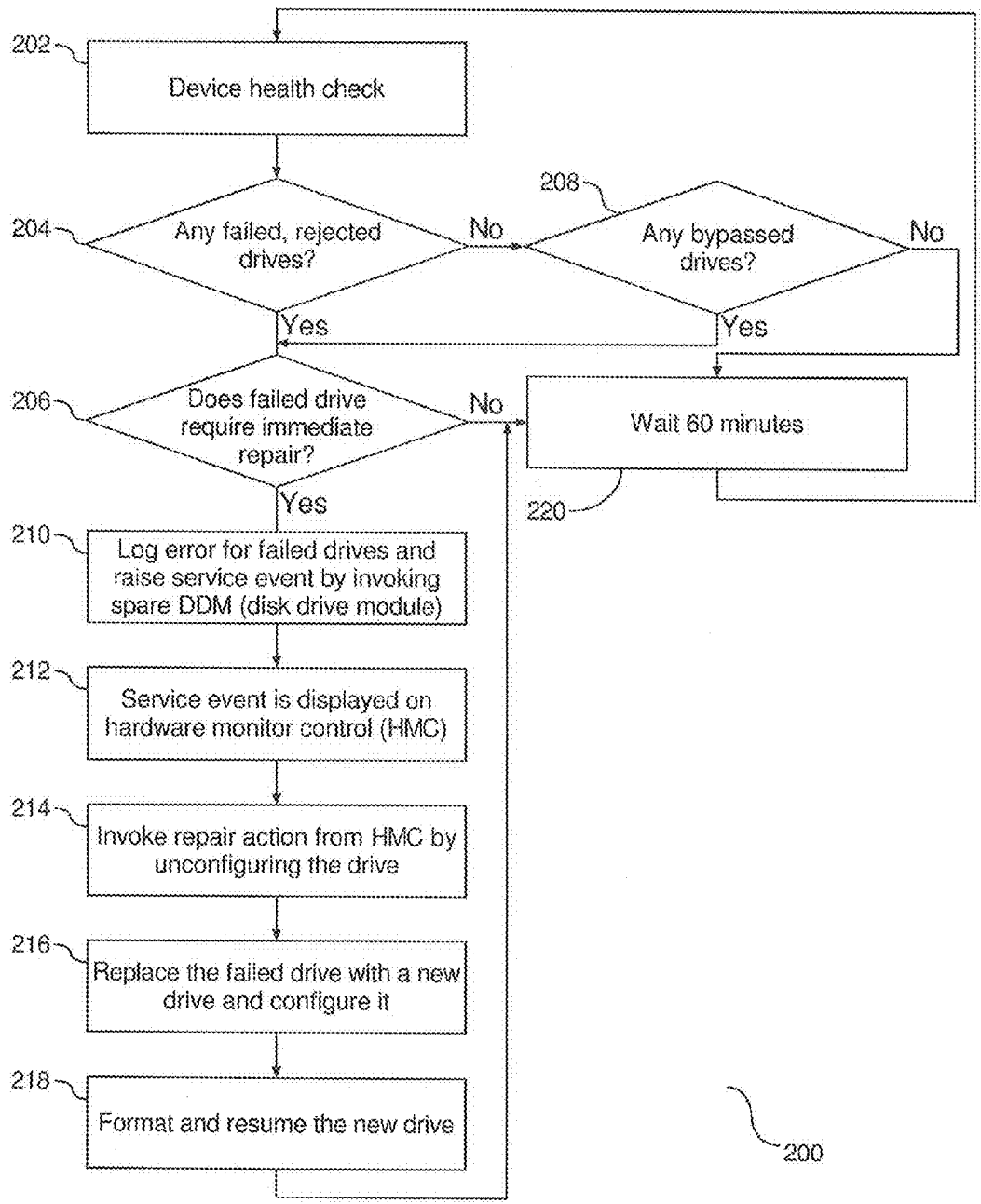
FIG. 3 is a prior art flow chart illustrating repair and/or replacement of a failed module in a RAID.
Figure 6:
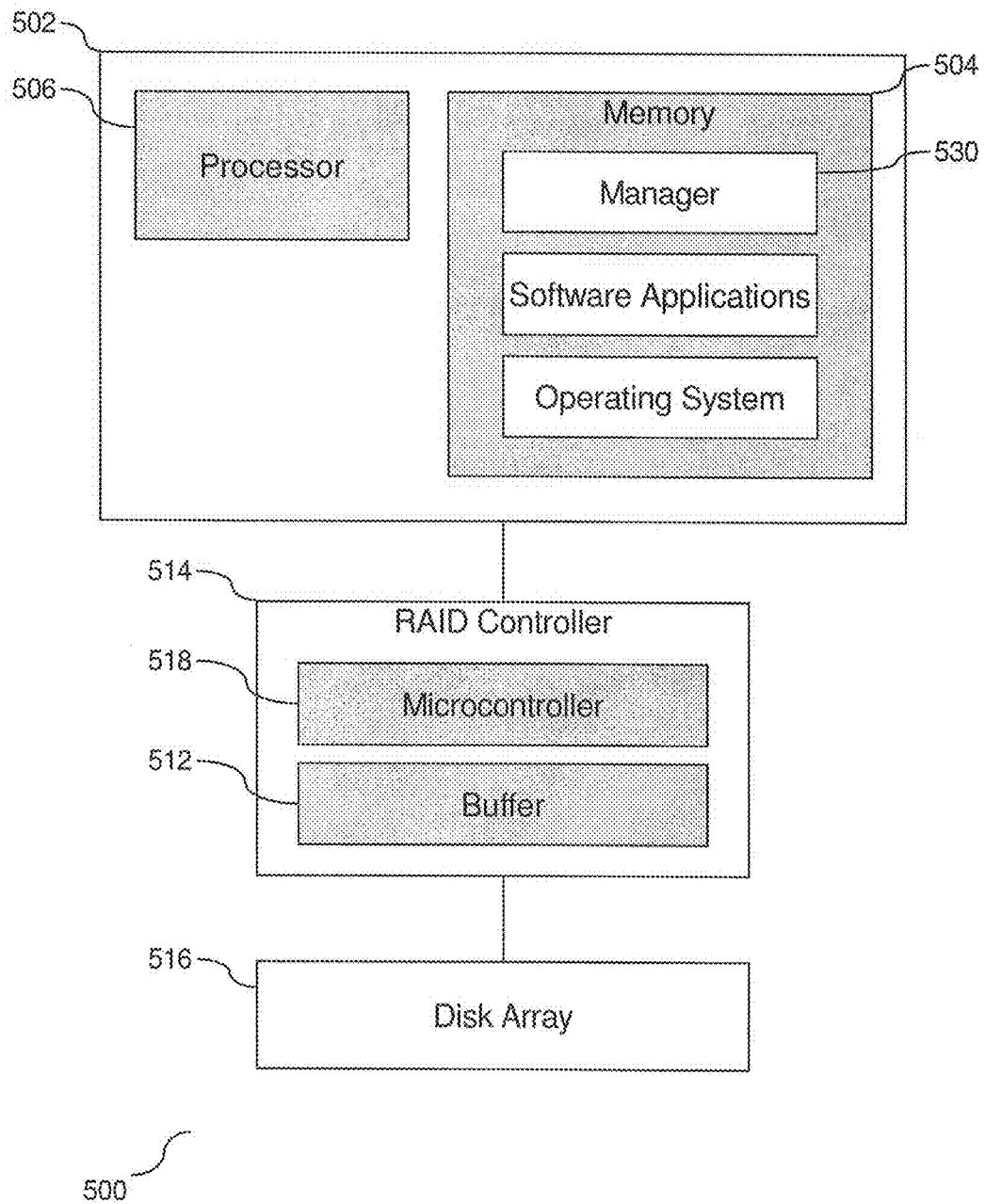
FIG. 6 is a block diagram illustrating placement of a manager in the computer system in communication with the RAID.

In one embodiment, a drive failure manager is provided in software or hardware. With respect to the software implementation, the manager may include, but is not limited to, firmware, resident software, microcode, etc. The software implementation can take the form of a computer program product accessible from a computer-useable or computer-readable medium providing program code for use by or in connection with a computer or any instruction execution system. FIG. 6 is a block diagram (500) illustrating placement of the manager in the system hardware. The illustration shows a computing device (502) with a processor (506) coupled to memory (504). As shown, the computing device (502) is in communication with a mass storage array (516) through a controller (514). As shown in FIG. 3, the controller (514) includes a micro controller (518) and a buffer (512). A manager (530) is shown residing in memory (504) of the computer device (502). The manager may implement instructions to control storage of data in an associated buffer (512) from a failing or failed disk drive, and to administer instructions to unconfigure a failed drive following storage of the data. In one embodiment, the manager (530) may be a hardware element that resides in the computing device (502) external to the memory.

As shown in FIGS. 5 and 6, failed disk drive modules are detected and attended to so that the failure does not affect the operating efficiency of the RAID. Another aspect of maintaining the operating efficiency of the RAID is to ensure that there is not an excess quantity of disk drive modules designated as spares.

Figure 7:
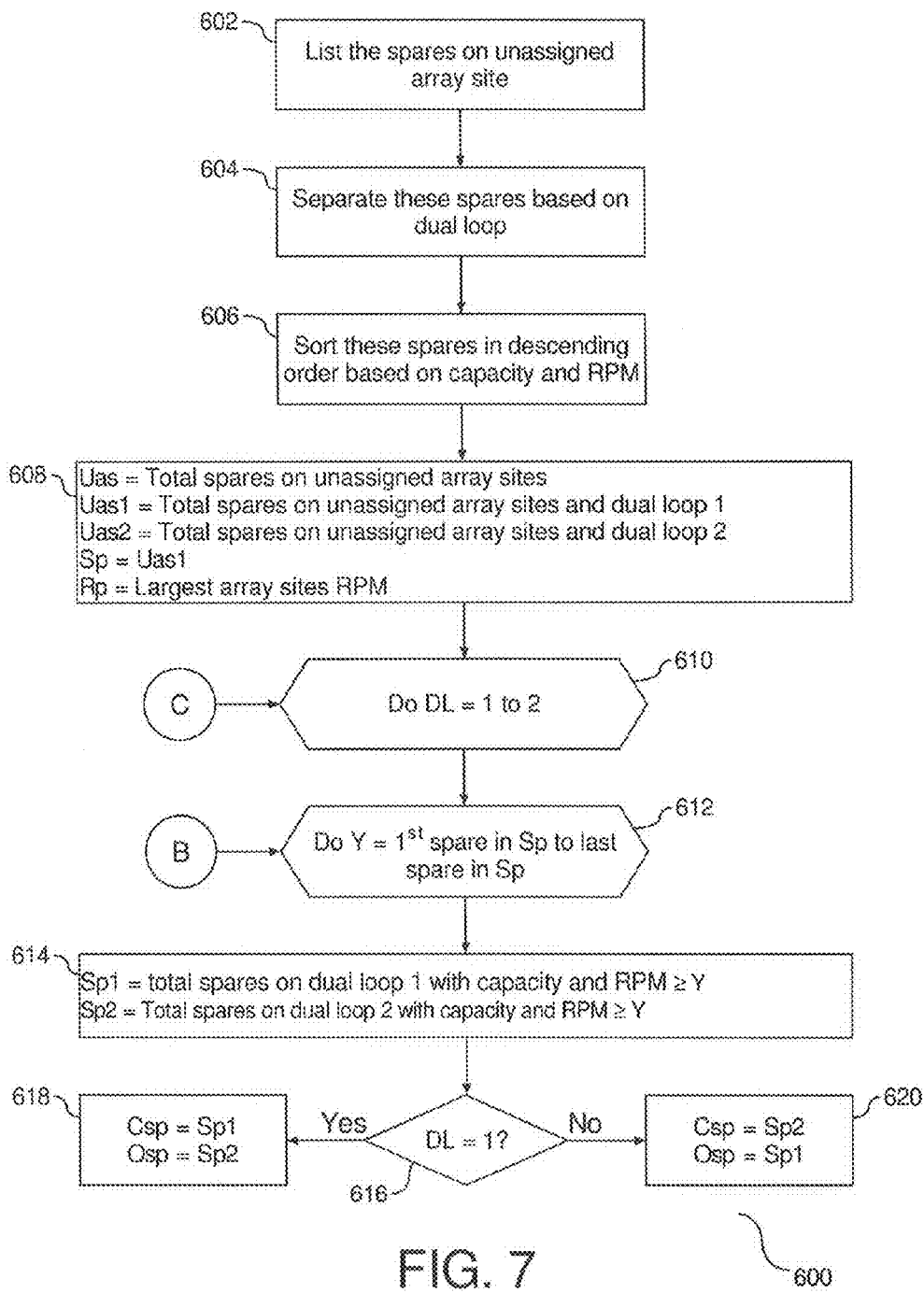
FIG. 7 is a flow chart illustrating a first part of a process for releasing excess spare disk drive modules in a RAID.

FIG. 7 is a flow chart (600) illustrating a process for freeing up surplus spare disk drive modules on a storage server. It should be noted, spare disk drive modules on an assigned array site are required spare disk drive modules. Therefore, the process need only review the quantity of surplus spare disk drive modules on an unassigned array site. Initially, the spare disk drive modules on unassigned array site(s) of a designated device adapter are listed (602). The spare modules listed at step (602) are separated based upon the dual loop assignment (604), such that one list is for the first dual loop and the second list is for the second dual loop. Thereafter, the spare modules are sorted in descending order based upon capacity and RPM (606). The variable $U_{as}$ is assigned to the total number of spare modules on unassigned array sites; the variable $U_{as1}$ is assigned to the total number of spare disk drive modules on unassigned array sites of the first dual loop; the variable $U_{as2}$ is assigned to the total number of spare disk drive modules on unassigned array sites of the second dual loop; the variable $S_p$ is assigned the value associated with the $U_{as1}$ value; and the variable $R_p$ is assigned the value of the RPM of the largest array site (608), e.g. Rp is the RPM associated with the largest capacity array site. For example, in one embodiment arrays are configured such that the first array site is the largest capacity array site. In such an embodiment, Rp is determined by checking the RPM associated with the first array site.

Starting with the first dual loop (610) and the first spare disk drive module on the unassigned array site in question (612), the variable $S_{p1}$ is assigned to the total number of spare disk drive modules on the first dual loop with a capacity and RPM greater than or equal to the spare in question, and the variable $S_{p2}$ is assigned to the total number of spare disk drive modules on the second dual loop with a capacity and RPM greater than or equal the spare in question (614). A determination is then made as to whether the dual loop in comparison is the first dual loop (616). If the determination as step (616) indicates that this is the first dual loop, then the variable $C_{sp}$ is assigned to the value assigned to $S_{p1}$, and the variable $O_{sp}$ is assigned to the value assigned to $S_{p2}$ (618). Otherwise, the variable $C_{sp}$ is assigned to the value assigned to $S_{p2}$, and the variable $O_{sp}$ is assigned to the value assigned to $S_{p1}$ (620). Accordingly, the first part of the process for freeing up unassigned spare disk drive modules for assignment to an array site includes listing the spare disk drive modules on an unassigned array site and separating and sorting the spare modules based on capacity and RPM.

As noted above, it is preferred that there be designated four spare disk drive modules in an array site with two of the spare modules being on the first dual loop and two of the spare modules being on the second dual loop. In one embodiment, sparing of disk drive modules across the dual loop may be allowed. However, such an allowance may create an in-balance of spare disk drive modules across the dual loop, i.e. all four spare disk drive modules on the first dual loop, or three spare disk drive modules on one dual loop with one spare disk drive module on the second dual loop. In one embodiment, it may be preferred that there may be more than four disk drive modules in an array site designated as spare modules, or fewer than four disk drive modules designated as spares.

Figure 8:
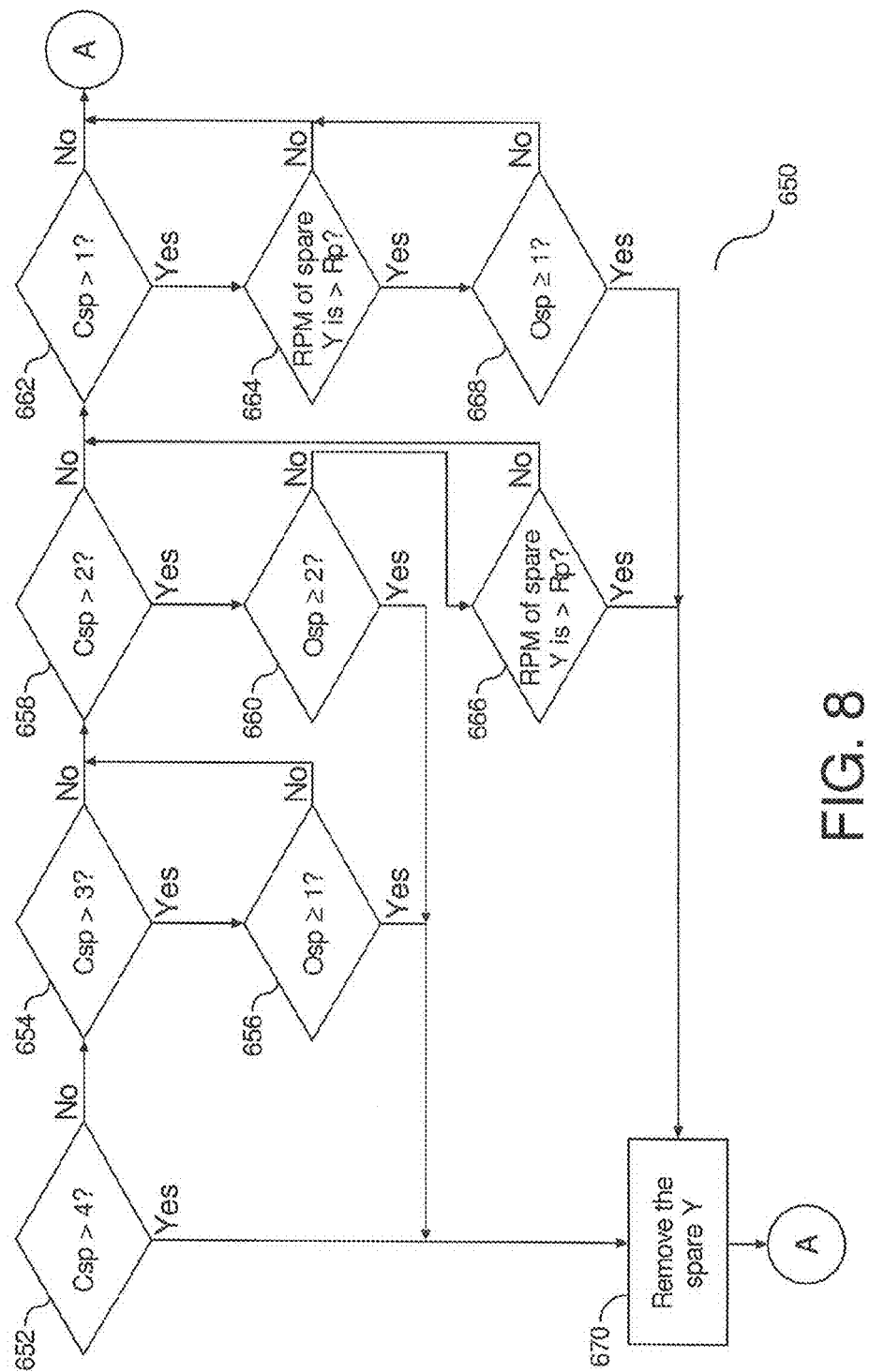
FIG. 8 is a flow chart illustrating a second part of a process for releasing excess spare disk drive modules in a RAID.

The following description is provided on the basis of the preference of four disk drive modules designated as spares on a device adapter, but may be modified based upon the designation. FIG. 8 is a flow chart (650) illustrating the second part of the process of reclassifying disk drive modules designated as spare modules in an unassigned array site where such modules have been determined to be superfluous. Following step (620) in FIG. 7 and for each spare disk drive module in a first dual loop of an unassigned array site, a determination is made as to whether there are more than four spare disk drive modules, including the spare in question, Y, with a capacity and RPM greater than or equal to this spares capacity and RPM on this dual loop (652). A positive response to the determination at step (652) will result in removal of the spare in question from the unassigned array site (670). In one embodiment, removal of the spare module at step (670) results in designating the modules as a non-spare module for the same array site. Similarly, a negative response to the determination at step (652) will result in a subsequent determination as to whether there are more than three spare disk drive modules, including the spare in question, Y, with a capacity and RPM greater than or equal to this spare's capacity and RPM on this dual loop (654). A positive determination at step (654) results in a subsequent determination as to whether there are one or more spare disk drive modules, including the spare in question, Y, on the opposite dual loop with a capacity and RPM greater than or equal to this spare's capacity and RPM (656). A positive response to the determination at step (656) will result in removal of the spare in question from the unassigned array site (670). The purpose is to have higher capacity and RPM spare disk drive modules available as spare modules since they can replace a lower capacity and RPM disk drive module, while the inverse is not true.

Following a negative response to the determination at step (654) or (656), a subsequent determination is made as to whether there are more than two spare disk drive modules, including the spare in question, Y, with a capacity and RPM greater than or equal to this spare's capacity and RPM on this dual loop (658). A positive determination at step (658) results in a subsequent determination as to whether two or more spare disk drive modules, including the spare in question, Y, on the opposite dual loop with a capacity and RPM greater than or equal to this spare's capacity and RPM (660). A positive response to the determination at step (660) will result in removal of the spare in question from the unassigned array site (670). However, a negative response to the determination at step (660) will result in a determination as to whether the RPM of the spare in question, Y, is greater than the largest arrays sites RPM (666). The determination at step (666) is provided to ensure that the array site is configured for one spare on each dual loop to have a high RPM to cover higher RPM array sites since a higher RPM spare can efficiently replace a lower RPM module. A positive response to the determination at step (666) will result in removal of the spare in question form the unassigned array site (670). However, a negative response to the determinations at steps (658) or (666) will result in a determination of whether there is more than one spare disk drive module, including the spare in question, Y, with a capacity and RPM greater than or equal to this spare's capacity and RPM on the first dual loop (662). Similarly, if the response to the determination at step (662) is negative, then proceed to step (682) to proceed with the next spare, Y, to determine whether it is to be re-designated. If the response to the determination at step (662) is positive, a determination is made as to whether the RPM of the spare in question, Y, is greater than the largest arrays sites RPM (664). A negative response to the determination at step (664) will result in proceeding to step (682) to proceed with the next space module, Y, to determine whether it is to be re-designated. However, a positive response to the determination at step (664) will result in a determination as to whether there are one or more spare disk drive modules, including the spare in question, Y, on the opposite dual loop with a capacity and RPM greater than or equal to this spare's capacity and RPM (668). A positive response to the determination at step (668) will result in removal of the spare in question from the unassigned array site (670). Accordingly, the steps illustrated in FIG. 7 above outline the process of determining a the quantity of spare disk drive modules in a first dual loop and parameters for freeing spare disk drive modules for use in another array site.

Figure 9:
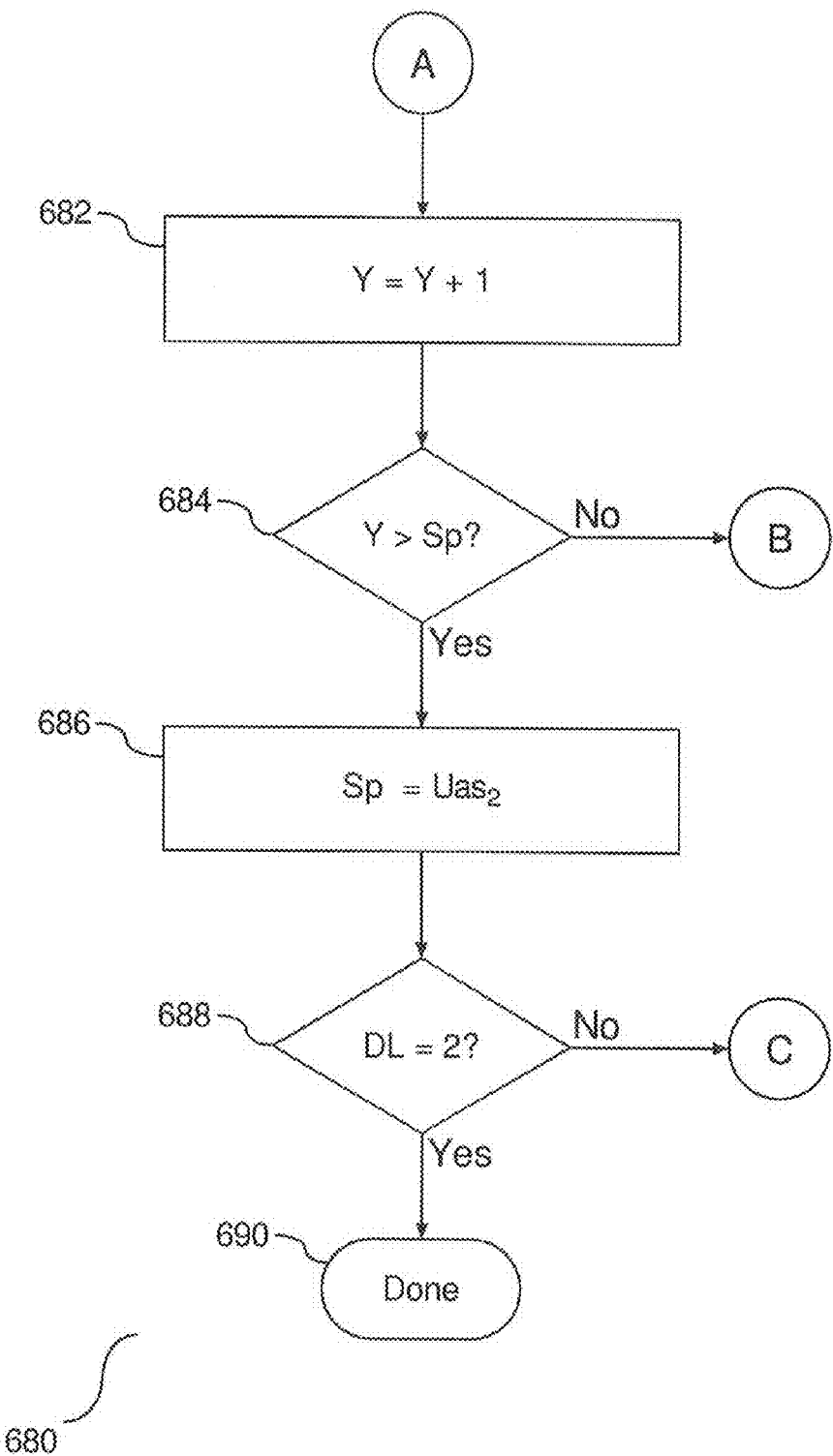
FIG. 9 is a flow chart illustrating a third part of a process for releasing excess spare disk drive modules in a RAID.

FIG. 9 is a flow chart (680) illustrating the final process of reclassifying disk drive modules. Following a negative response to the determinations at steps (662)-(668) or completion of step (670) the process is repeated for each spare disk drive modules in the first dual loop by incrementing Y (682) and determining if the value of Y is within the total spare disk drive modules on unassigned array sites in the first dual loop (684). A negative response to the determination at step (684) will result in a return to step (612). However, a positive response to the test at step (684) is an indication that all of the spare disk drive modules in the first dual loop have been considered for emancipation. Thereafter, the process switches from the first dual loop in communication with the RAID device adapter to the second dual loop in communication with the RAID device adapter for this unassigned array site (686). A determination is then made as to whether the spare disk drive modules in the second dual loop have been evaluated (688). One form of the determination at step (688) may take the form of determining the value of the variable DL. The variable DL designates the first or second dual loop. If the variable DL has been incremented from the first dual loop integer to the second dual loop integer, this is an indication that spare disk drive modules of the second dual loop have already been considered. If the determination at step (688) indicates that the second dual loop of the device adapter has not been previously evaluated, the process returns to step (610) to repeat the spare disk drive module evaluation for the second dual loop of the unassigned array site. Similarly, if the determination at step (688) indicates that the second dual loop of the device adapter has completed evaluation of the second dual loop, then the process is completed (690). Accordingly, the process of freeing spares in an unassigned array site separately considers spare modules of both dual loops in communication with a RAID device adapter.

The above described process outlines how to analyze excess spare disk drive modules in an unassigned array sites and to emancipate one or more of the identified spare disk drive modules for other uses should the analysis determine such emancipation is an option.

As discussed above, the device adapter (116) for the disk drive modules has a first dual loop (112) and a second dual loop (114). In one embodiment, each of these dual loops may include a dual loop manager (not shown) in communication with the device adapter (116) of the disk drive modules provided in software or hardware. The manager is responsible for executing a set of rules to list the spare disk drive modules in the respective dual loop in an unassigned array site that are in communication with the device adapter, and to determine if any of the listed disk drive modules are superfluous and thereby available for emancipation. FIG. 6 is a block diagram showing an example of a hardware implementation of a manager (530). The block diagram of FIG. 6 may be modified such that the manager (530) is configured to execute a set of rules to lost spare disk drive modules in the respective dual loop in an unassigned array site that are in communication with the device adapter, and to determine if any of the listed disk drive modules are superfluous and thereby available for emancipation.

With respect to the software implementation, the managers would reside in memory and may include, but is not limited to, firmware, resident software, microcode, etc. The software implementation can take the form of a computer program product accessible from a computer-useable or computer-readable medium providing program code for use by or in connection with a computer or any instruction execution system. In one embodiment, the managers may reside in system hardware external to memory and in communication with the device adapter (116).

As may be seen above, it is not uncommon to a RAID to be comprised of a plurality of non-uniform disk drive modules.

Figure 10:
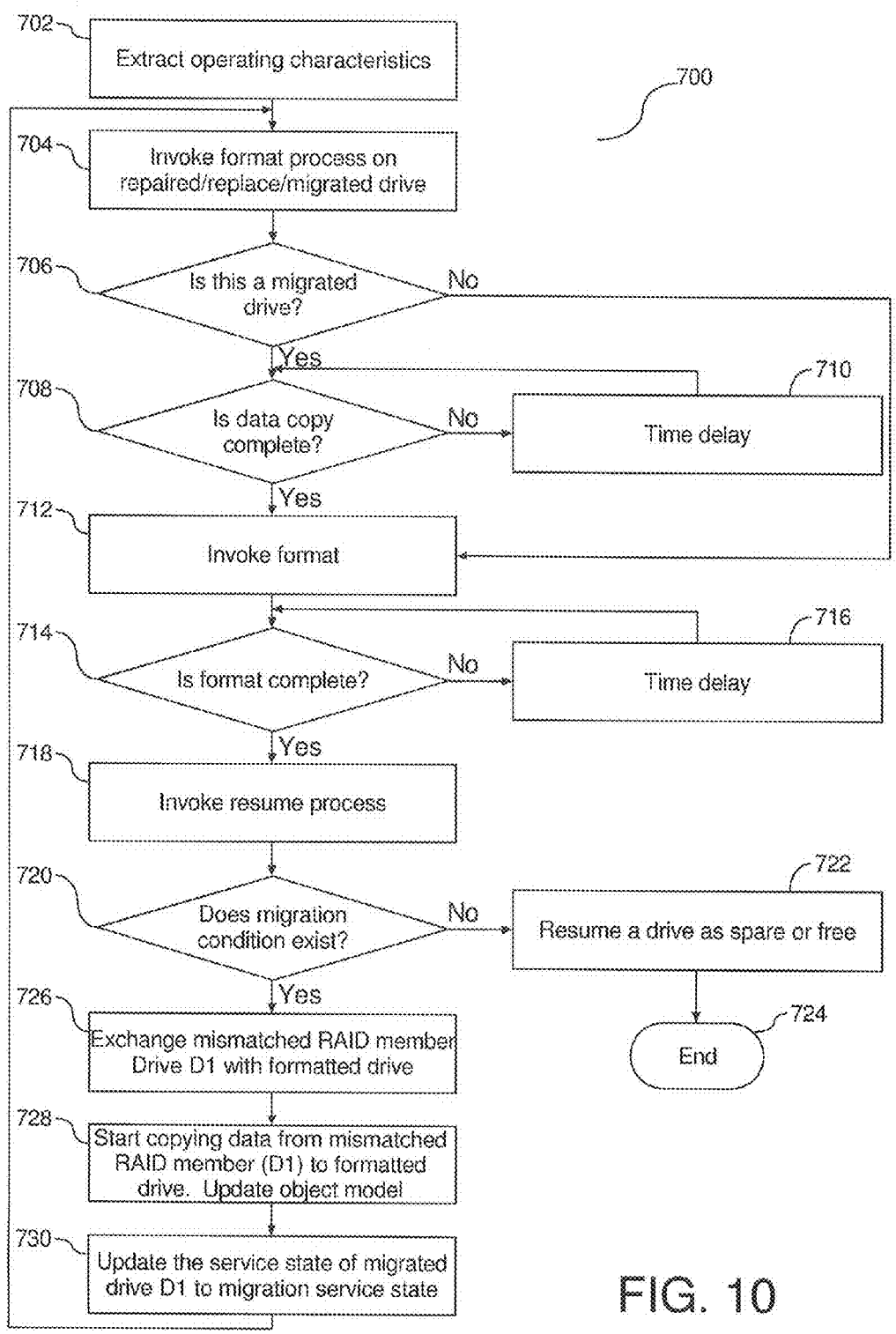
FIG. 10 is a flow chart illustrating an automated process for replacing mismatched modules in a RAID.

FIG. 10 is a flow chart (700) illustrating the process for replacing a disk drive module in a RAID, whose characteristics do not match with the other RAID members, with a matching or near match disk drive module. Such characteristics may include a module with different speed, capacity, interface rate, as well as a module on a wrong dual loop. Replacement of a module, which is hereinafter referred to as migration, arises when a RAID member module fails and the only available module(s) for replacement is not a perfect match. Under such circumstances, the replacement module sought is one with the closest matching operating characteristics. Migration takes place when a RAID is evaluated to determine if any of the member disk drive modules do not match with the characteristics of the RAID. Initially, the operating characteristics of a formatted disk drive module available to replace a mismatched RAID member module are extracted (702). Thereafter, a format process is invoked on a repaired, replaced, or migrated disk drive module selected (704). Following step (704), a determination is made as to whether the format process invoked on the designated module (s) is for a migrated module (706), i.e. a non matching RAID member module that has been replaced or is in the process of being replaced. If it is determined that the designated modules is a migrated module, data on the module is salvaged. A determination is conducted as to whether the data transfer from this migrated, i.e. non-matching member of the RAID, chosen replacement module is completed (708). A negative response to the determination at step (708) will result in a time delay to enable the data transfer to complete (710). Following completion of the time delay, the process returns to step (708) until the data transfer process is complete. Accordingly, the initial steps of a module migration include transfer of a data from a device selected for migration to a matching disk drive module. Once the data copy process is complete, this module may become a permanent member of the RAID.

Following completion of the data transfer from the module selected for migration, the module is formatted (712). The format process is monitored to verify completion. The monitoring process includes a determination as to whether the format process is complete (714), and imposing a time delay (716) if it is determined at step (714) that the format process is not complete. In one embodiment, the time delay at step (716) may be a fixed time interval, or modifiable time interval, based upon system parameters to format a disk drive module. Once it has been confirmed that the format of the module selected for migration has been completed, the select module may be retained for use as a spare module to replace any disk drive modules that may be subject to failure, or it may also be used to do another round of migration, if its found to be a match to replace a non-matching RAID member.

Each disk drive module that has been formatted and set aside as a spare module, may be utilized for storage of data. At step (718), a resume process is invoked wherein a previously failed and reformatted module or a new module is reused for storage of data. Following step (718), it is determined whether a migration condition exists (720). A migration condition arises when the operating characteristics of one module in a RAID do not match with the remaining modules in the RAID and one or more reformatted modules is a perfect match or a near match to the RAID. In one embodiment, there may be more than one module in the RAID whose characteristics do not match with the characteristics of the remaining modules. However, in most cases, it will be a minimum quantity of modules with non-matching characteristics. If the response to the determination at step (720) is negative, the reformatted module continues to operate under its prior operating classification following the reformatting process (722), i.e. as a spare module or as a free module, depending upon the prior classification, and the migration process is completed (724). However, if the response to the determination at step (720) is positive, a module in a RAID that has characteristics that do not match with those of the other members of the RAID is replaced with a re-formatted module (726). In one embodiment, there may be more than one re-formatted module available for migration. Following the replacement at step (726), copying of data from the mismatched module member of the RAID to the replacement module is initiated (728).

The RAID storage system is developed on the basis of an object model, wherein the characteristics of each disk drive module are maintained. Among the characteristics in the object model is the service state of the each module. When the service state of a disk drive module is set to migration, this serves as an indicator that data from the disk drive module is being copied from the source module to a secondary storage device. The secondary storage device may be a repaired module, a spare module, a free module, etc. At such time as the copying of the data to the secondary storage device is complete, a format process for the module subject to migration is initiated and the service state of the module is changed to a different service state. Following step (728), the object model of the migrated disk drive module is updated to change the service state to a migrated service state (730). When the process of copying data is initiated, the object model of the mismatched module is updated to reflect the state of this module. In one embodiment, the service state in the object model may be in the form of an integer, wherein different integers reflect different service states of the module. For example, one service state integer may reflect operation of the module, and another integer may reflect that the module is subject to migration, etc. Accordingly, the service state in the object model is utilized to manage the operating state of a module subject to migration.

In one embodiment, a migration manager is provided in software or hardware. With respect to the software implementation, the manager may include, but is not limited to, firmware, resident software, microcode, etc. The software implementation can take the form of a computer program product accessible from a computer-useable or computer-readable medium providing program code for use by or in connection with a computer or any instruction execution system. As shown in FIG. 6, the manager (530) may be a tool in the system hardware. The manager (530) of FIG. 6 may be modified to implement instructions to control copying of data for a module selected for replacement from a mismatched module, and to administer instructions to exchange the mismatched module with another module, i.e. a reformatted or otherwise available module. In one embodiment, the manager (530) seeks a replacement module for the mismatched module with operating characteristics that match or nearly match those of the other members of the RAID. Additionally, the manager may be a hardware element that resides in the computing device (502) external to the memory.

Figure 12:
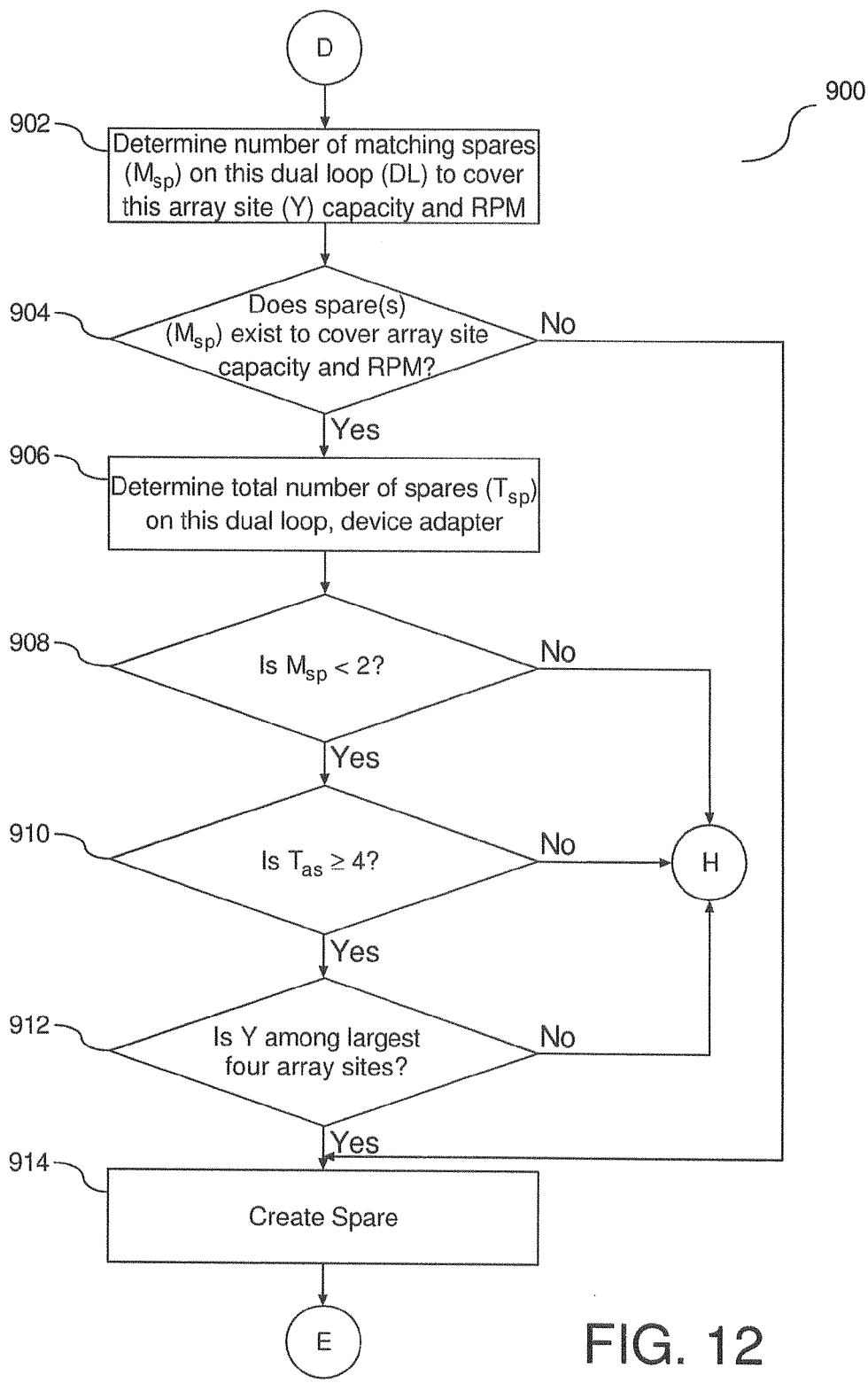
FIG. 12 is a flow chart illustrating a process for determining if a spare disk drive module should be created.

As shown above, disk drive modules assigned to array site can be migrated to form uniform or near uniform array site. Conversely, a routine is provided to effectively assign one or more modules to an array site on a permanent or temporary basis in response to failure of a disk drive module. FIG. 12 is a flow chart (800) illustrating the first part of a process for equitably creating spare disk drive modules for array sites. The unassigned array sites on a device adapter are listed (802), and the total number of array sites on the device adapter is listed (804). The unassigned array sites are sorted in descending order based upon capacity and RPM (806). Thereafter, the following assignments are invoked: the variable DL is assigned to represent the number of dual loops in communication with the device adapter (808), the variable Uas is assigned to represent the total number of unassigned array site in communication with the device adapter (810), and the variable $T_{as}$ is assigned to represent the total number of array site in communication with the device adapter (812). Starting with the first array site listed in Uas (814), a determination is made as to whether the dual loop in comparison is the second dual loop (816). If the response to the determination at step (816) is negative, the variable DL is assigned to the second dual loop (818) and if the response to the determination at step (816) is positive, the variable DL is assigned to the first dual loop (820). Following the assignment at step (818) or (820), a determination is made as to whether any spare disk drive modules exist on the array site in question (822). Accordingly, the instructions outlined in the first part of the process for equitably creating and assigned spare disk drive modules sorts the unassigned array sites based upon capacity and RPM, and for each unassigned array site determines if there are spare disk drive modules available.

Figure 11:
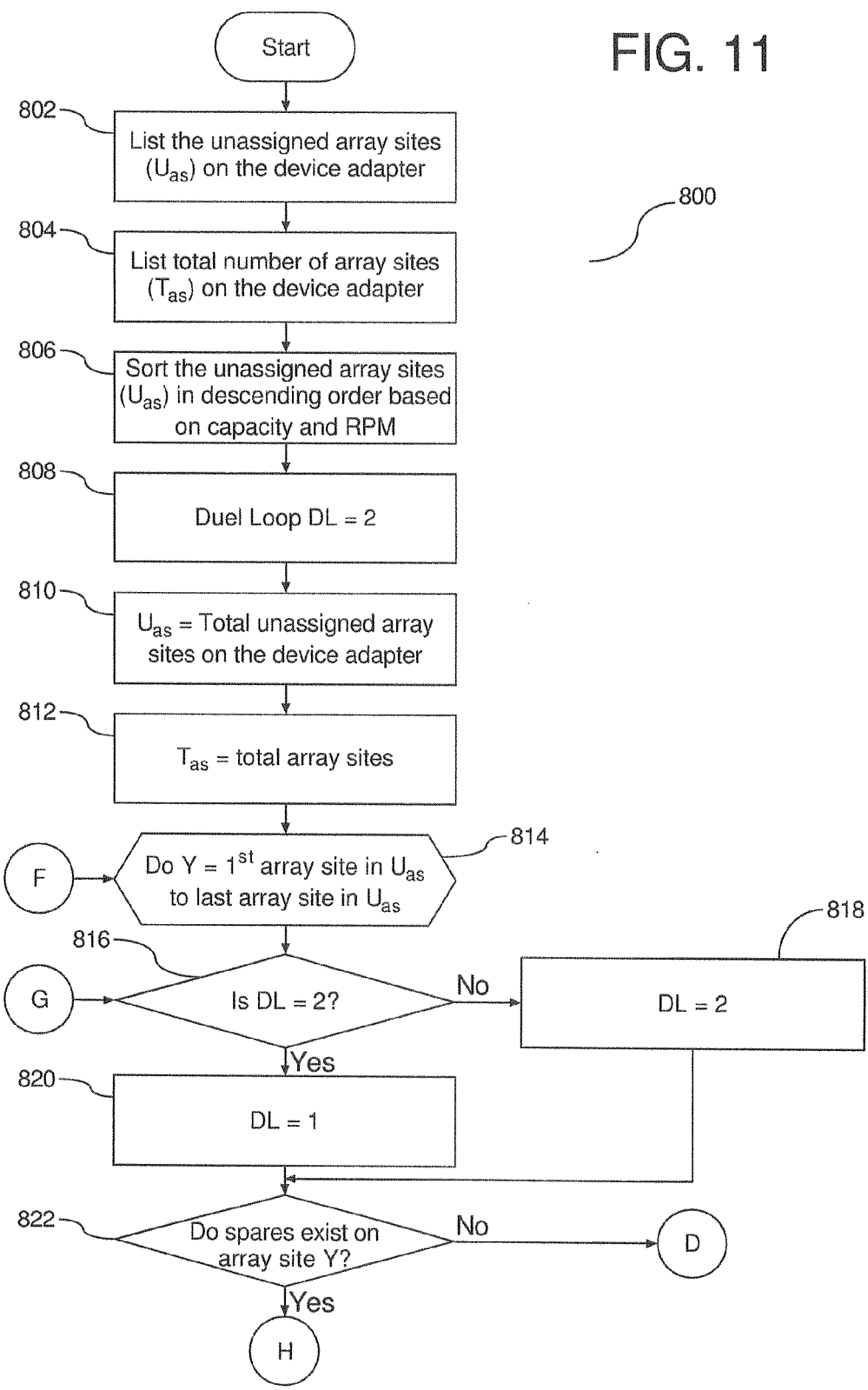
FIG. 11 is a flow chart illustrating a process for listing the unassigned array sites based upon select criteria.

FIG. 12 is a flow chart (900) outlining the process of creating a spare disk drive module under limited circumstances in response to a negative determination at step (822) of FIG. 11. A positive response to the determination at step (822) proceeds to step (1010) in FIG. 13. If the response to the determination at step (822) is negative, the following determinations and assignments are invoked to equitably create and assign spare disk drive modules to an appropriate array site. Initially, the number of matching spare disk drive modules on the dual loop in question that can accommodate the identified array site's capacity and RPM are determined and assigned the variable $M_{sp}$ (902). Thereafter, a determination is conducted as to whether there are one or more spare disk drive modules available in the array site in question, Y, that cover the capacity and RPM of the array site in question (904). A negative response to the determination at step (904) indicates there is a need for a spare disk drive module at this array site that can accommodate the capacity and RPM of the disk drive modules in this array site. As such, a negative response to the determination at step (904) will result in creation of a spare disk drive module (914). However, if the response to the determination at step (1004) is positive, the total number of spare disk drive module on this dual loop in communication with the device adapter is determined and assigned to the variable Tsp (906). Thereafter, a determination is made as to whether the variable Msp, i.e. the number of matching spare disk drive modules on this dual loop, is less than two (908). The determination at step (1008) is conducted to ensure that there are at least two spare modules at the array site in question with the capacity and RPM to meet the needs of the array site. In one embodiment, the quantity of spare modules at step (908) may be increased or decreased depending upon the needs of the array site and the RAID. If the response to the determination at step (908) is positive, a subsequent determination is made as to whether the variable $T_{as}$, i.e. the total number of array sites in communication with the device adapter, is greater than or equal to four (910). In one embodiment the quantity of array site in comparison with the variable $T_{as}$ at step (910) may be less then or greater than the number four. Such a modification may be made depending upon the needs of the array site(s) and the RAID. Similarly, if the response to the determination at step (910) is positive, a determination is conducted as to whether this array site, Y, is among the largest four array sites in communication with the device adapter (912). In one embodiment, the comparison to the quantity of four array site may be modified to be fewer or a greater quantity of array sites. A positive response to the determination at step (912) will proceed to step (914) for creation of a spare disk drive module for this array site. However, a negative response to any of the determinations at steps (908), (910), or (912), will proceed to step (1010) in FIG. 14. Accordingly, the steps outline in FIG. 13 focus on creation of a spare disk drive in limited circumstances wherein the created spare disk drive module meets the capacity and RPM for the array site concerned.

Figure 13:
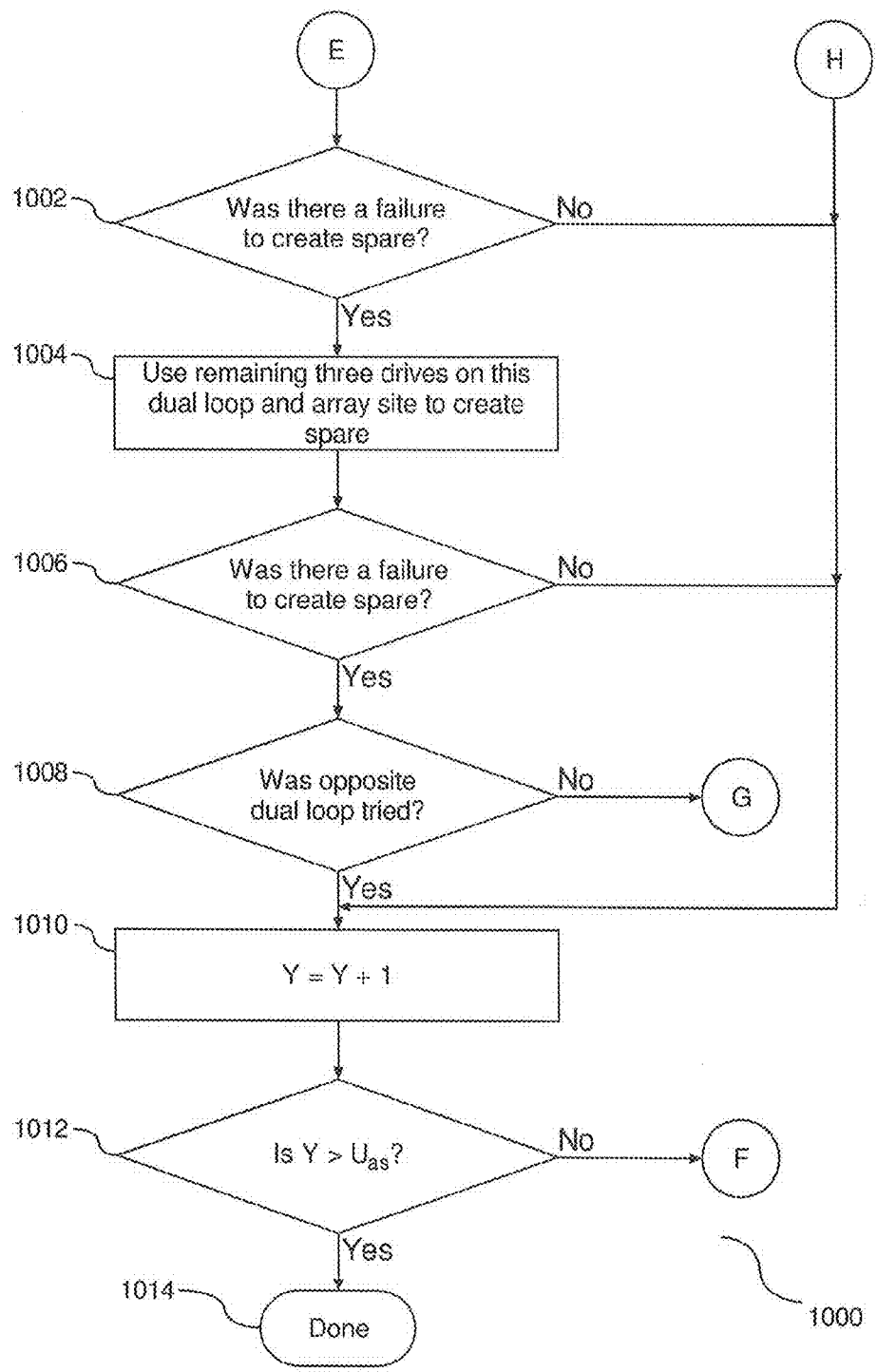
FIG. 13 is a flow chart illustrating a process for resolving a failure of creation of the disk drive module.

FIG. 13 is a flow chart (1000) outlining the final tier of the process for equitably creating and assigning spare disk drive modules to one or more unassigned array sites. Following the creation of a spare disk drive module at step (914) of FIG. 13, a determination is made as to whether the creation of the spare disk drive module failed (1002). A positive response to the determination at step (1002) will result in an increment to the variable, Y (1010), to proceed with reviewing the next unassigned array site in the list of unassigned array sites in communication with the device adapted. Following step (1010), a determination is made as to whether there are any more unassigned array sites to be evaluated (1012). In one embodiment, the determination at step (1012) conducts a test to determine if the variable Y is greater than the variable $U_{as}$. If the response to the determination at step (1012) is positive, then there are no more array sites in communication with the device adapter to be evaluated (1014). However, if the response to the determination at step (1012) is negative, the process returns to step (814) of FIG. 11. Similarly, a positive response to the determination at step (1002) is an indication that the instruction for creation of a spare disk drive module has failed and the remaining disk drive modules assigned to this dual loop and array site must be used to create a spare disk drive module (1004). Thereafter, a determination is made as to whether the instructions at step (1004) failed to create a spare disk drive module (1006). If the determination at step (1006) indicates failure, a subsequent determination is made as to whether the remaining disk drive modules have tried to create a spare module on the opposite dual loop (1008). A negative response to the determination at step (1008) returns to step (816) of FIG. 11, whereas a positive response to the determination at step (1008) proceeds to step (1010). Accordingly, the process outlined in FIG. 13 addresses the limitation associated with a failure to create a spare disk drive module.

As shown in FIGS. 11, 12 and 13, the process for creating spare disk drive modules in an unassigned array site lists all available array sites in communication with a device adapter and sorts them in descending order based on capacity and RPM. This approach resolves the limitations of sorting based upon arbitrary numerical identifiers.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Advantages Over the Prior Art

As described in detail above, an interrupt is generated by the RAID controller upon failure of a disk drive in an associated array of drives. The use of the interrupt enables immediate service of the failed drive. In addition, this automated process for detecting and locating a failed drive minimizes manual intervention into the repair process. Manual intervention is only required to locate the failed drive and to physically replace the failed drive with an operable drive. The location of the failed drive is facilitated by the routine generating a visual indicator to display the location of the failed drive. This repair process does not depend on the availability of a systems display console.

Both the quantity and quality of spare disk drive modules in an array site provides a safety barrier for the storage system to ensure availability of an appropriate module in the event of failure of a non-spare module in the array. In addition, the balance of modules among the dual loops ensures that there is a balance between the array site and the device adapter in communication with the array site. There are a lot of factors that are involved in establishing a confident back-up in a redundant array. The availability of ensuring that the spare modules have the capacity and RPM to meet the highest level of any non-spare module in the array site ensures that the spare disk drive module is compatible with one or more non-spare disk drive modules. Accordingly, there are a plurality of factors that ensure the availability and viability of spare disk drive modules to prevent loss of data in the event of failure of one or more disk drive modules.

The migrated disk drive modules resume operation as a spare, free, or replacement module instead of being wasted as a non-formatted drive. The service state in an object model is used as a management tool for designation of operation of a module. For example, the service state may indicate the specified module is a spare module in a RAID, a free module unassigned to a RAID, a module designated for migration, a module in the process of being reformatted, etc. The use of the service state in the object model reduces code overhead and makes the code available and manageable.

Each array site in communication with a device adapter is listed in descending order based upon the capacity and RPM of the array site. Thereafter, one or more determinations are conducted to ensure that each unassigned array site has a sufficient quantity of spare disk drive modules with a capacity and RPM that match those of the array site in question. The process ensures an equitable distribution of spare disk drive modules across the sites in communication with the device adapter in such a manner that the spare disk drive modules meet the capacity and RPM of the array site.

Alternative Embodiments

It will be appreciated that, although specific embodiments of the invention have been described herein for purposes of illustration, various modifications may be made without departing from the spirit and scope of the invention. In particular, the routine for detecting and replacing a failed disk drive module may be applied to multiple drives that failed separately, collectively, or in close time proximity.

Additionally, the spare disk drive modules that are determined to be superfluous can be removed from the array site and made available for use in an alternative array site. Similarly, the spare disk drive modules can remain in the array site but have their designation changed from spare to non-spare so that a set quantity of disk drive modules remain in the array site. In one embodiment, the minimum quantity of spare modules per array site may be modified to require a greater number of modules in the array site as spare modules. Similarly, this minimum designation of spare modules may be reduced to a fewer number.

As noted above, data from a non-matching RAID module is copied to a matching or near-matching module during migration of a drive. This process or replacing non-matching modules is also known as migration and may continue until each RAID in a system is complete with matching or near matching disk drive modules. In one embodiment, the replacement disk drive modules may not be a perfect match to the characteristics of the RAID. Similarly, a replacement action for the near match condition may be used for the migration process if the reformatted disk drive module is not a perfect match to replace the mismatched member drive of the RAIDs on the storage system. If the reformatted drive is not a perfect match for the RAID, and if migration conditions exits, it may be advisable to go for a near match. In one embodiment, a near match exists when the characteristics of the migrated module are close to those of the RAID, but is not an exact match. A near match is sometimes advisable since it may set right the RAID to some extent. On the next search, if the reformatted drive is a perfect match to replace the near match drive, again the migration is carried out to create a RAID with uniformity among its disk drive modules.

With respect to the method and tool for creating spares, the routine for selecting the quantity of array sites to be the largest with respect to capacity and RPM may be modified to include more than four array sites, or less than four array sites. Accordingly, the scope of protection of this invention is limited only by the following claims and their equivalents.

We claim:

1. A method for automatic failure detection and repair of a failed disk drive module comprising:
configuring an array of disk drive modules in communication with a controller through a bus, said controller having a buffer for storage of data, and said controller being in communication with a processor and an associated operating system;
storing drive information from a failed disk drive module in said buffer in communication with the failed module;
generating an interrupt in response to said module failure and sending the interrupt to an operating system in communication with the failed module;
unconfiguring said failed module from an associated slot of said failed module in response to said interrupt;
designating a minimum quantity of modules within the array in communication with the controller as spare modules to replace the failed disk drive module in communication with the controller;
listing said designated spare modules at said controller in descending order of characteristics;
determining if there are any designated spare modules in excess of said minimum quantity of modules in dual loops of said controller; and
selectively designating an excess spare module in a first dual loop as a non-spare module based upon a rank of the excess spare module in said listing.

2. The method of claim 1, wherein unconfiguring said failed module comprises
displaying a visual indicator when said failed drive is unconfigured and
removing said failed module from an object data manager entry.

3. The method of claim 1, wherein said disk drive module comprises at least one module in a multiple module system.

4. The method of claim 1, further comprising instructions for extracting data stored on said module wherein said instructions are selected from a group consisting of:
an interrupt service routine and a shell script.

5. The method of claim 1, wherein storing data from a failed disk drive module in a buffer in communication with the failed module is managed by a controller in communication with said failed module.

6. The method of claim 1, further comprising:
identifying said failed disk drive module via an indicator in communication with a display.

7. The method of claim 6, further comprising
repairing said identified failed disk drive module by reformatting said module and returning said reformatted module to said array of disk drive modules.

8. A method for managing storage media comprising:
configuring a storage server with an array of disk drive modules so that data is replicated among the modules, said array having a plurality of array sites with each array site having a set of disk drive modules on opposite dual loops of a controller in communication with said array;
designating a minimum quantity of modules within the array sites in communication with the controller as spare modules to replace a failed module in communication with the controller;
listing said designated spare modules at said controller in descending order of characteristics;
determining if there are any designated spare modules in excess of said minimum quantity of modules in said dual loops of said controller;
selectively designating an excess spare module in a first dual loop as a non-spare module based upon a rank of the excess spare module in said listing.

9. The method of claim 8, wherein the step of selectively designating said excess spare module as a non-spare module includes selecting said module with a capacity and RPM less than the other spare modules of said dual loops of said controller and comparing said spare module with other designated spare modules in an opposite dual loop of said array.

10. The method of claim 8, further comprising
selecting an opposite dual loop of said array site and determining if there are any modules designated as a spare module in excess of said minimum designated quantity of modules in said opposite dual loop of said array site, and designating an excess spare module in said opposite dual loop as a non-spare module; and
comparing characteristics of said excess spare module to spare modules in said first dual loop and opposite dual loop of said array site, wherein said characteristics are selected from a group consisting of: capacity and RPM.

11. A computer system comprising:
an array of disk drive modules in communication with a processor through a bus, said array having an associated controller and a buffer in communication with said modules and said processor;
drive details from a failed disk drive module stored in said buffer in communication with said controller;
an operating system interrupt generated and sent to an operating system of said processor in communication with said failed module responsive to failure of said disk drive module in said array;
a module manager to unconfigure said failed module from an associated slot, wherein said manager is responsive to said interrupt;
a minimum quantity of modules within the array in communication with the controller designated as spare modules to replace the failed disk drive module in communication with the controller; and
a list of said designated spare modules at said controller in descending order of characteristics, wherein a determination is made if there are any designated spare modules in excess of said minimum quantity of modules in dual loops of said controller, and wherein an excess spare module in a first dual loop is selectively designated as a non-spare module based upon a rank of the excess spare module in said list.

12. The system of claim 11, wherein a visual display adjacent to a slot of said failed module indicates when said failed module has been unconfigured and said manager removes entry of said failed module from an associated object data manager after said failed module is unconfigured.

13. The system of claim 11, further comprising a set of instructions to extract data stored on said failed module, wherein said set of instructions is selected from a group consisting of: an interrupt service routine and a shell script.

14. The system of claim 11, further comprises a non-transitory computer readable storage medium;
drive details from a failed disk drive module stored in said buffer in communication with said controller;
an operating system interrupt generated and sent to an operating system of said processor in communication with said failed module responsive to failure of said disk drive module in said array;
a module manager to unconfigure said failed module from an associated slot, wherein said manager is responsive to said interrupt;
a minimum quantity of modules within the array in communication with the controller designated as spare modules to replace the failed disk drive module in communication with the controller; and
a list of said designated spare modules at said controller in descending order of characteristics, wherein a determination is made if there are any designated spare modules in excess of said minimum quantity of modules in dual loops of said controller, and wherein an excess spare module in a first dual loop is selectively designated as a non-spare module based upon a rank of the excess spare module in said list.

15. A computer system comprising:
a storage server with an array of disk drive modules having data replicated among the modules, said array having a plurality of array site with each array site having an even set of disk drive modules in opposite dual loops;
a minimum quantity of modules within said array site on said controller designated as spare modules to replace a failed module in communication with said controller; and
a first dual loop manager to list said spare modules in communication with said controller in an order of properties, to determine if any of said listed modules are in excess of said minimum designated spare module in a first of two dual loops of said controller, and to designate any identified excess spare modules as non-spare modules, said excess spare modules have a capacity and RPM less than other spare modules of said first and second dual loops of said controller, and a second dual loop director to communicate with a first dual loop director and to compare said spare module with other designated spare modules in said second dual loop of said array.

16. The system of claim 15, further comprising
a second dual loop manager to list said spare modules in communication with said controller in an order of properties, to determine if any of said listed modules are in excess of said minimum designated spare modules in said second dual loop of said controller, and to designate any identified excess spare modules as non-spare modules, said first and second dual loop manager compare characteristics of said excess spare modules in said first and second dual loops of said array site, and said characteristics are selected from a group consisting of: capacity and RPM.

\* \* \* \* \*